(12) United States Patent
Jain et al.

(10) Patent No.: US 10,171,445 B2
(45) Date of Patent: Jan. 1, 2019

(54) SECURE VIRTUALIZED SERVERS

(71) Applicant: International Business Machines Corporation, Armonk, NY (US)

(72) Inventors: Chethan Jain, Bangalore (IN); Maria R. Ward, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 15/198,270

(22) Filed: Jun. 30, 2016

(65) Prior Publication Data

US 2018/0007031 A1    Jan. 4, 2018

(51) Int. Cl.
| | |
|---|---|
| *H04L 29/06* | (2006.01) |
| *G06F 21/33* | (2013.01) |
| *G06F 21/53* | (2013.01) |
| *H04L 9/32* | (2006.01) |
| *G06F 9/48* | (2006.01) |

(Continued)

(52) U.S. Cl.
CPC ........ *H04L 63/0807* (2013.01); *G06F 21/335* (2013.01); *G06F 21/53* (2013.01); *G06F 9/455* (2013.01); *G06F 9/4856* (2013.01); *G06F 9/50* (2013.01); *G06F 9/5061* (2013.01);

(Continued)

(58) Field of Classification Search
CPC ..... H04L 63/0807; H04L 63/10; H04L 9/321; H04L 9/3213; H04L 29/06; G06F 9/4843; G06F 9/4856; G06F 9/455; G06F 9/4557; G06F 9/50; G06F 9/5061; G06F 9/5077;

(Continued)

(56) References Cited

U.S. PATENT DOCUMENTS 6,411,309 B1    6/2002  Ly
7,290,040 B2 *  10/2007 Newcombe ......... H04L 41/0896
                                                    709/217

(Continued)

FOREIGN PATENT DOCUMENTS

WO      2014166546 A1    10/2014

OTHER PUBLICATIONS

Liu et al., "QoS-aware I/O schedule for virtual machines in cloud computing environment", 2013 Seventh International Conference on Innovative Mobile and Internet Services in Ubiquitous Computing, © 2013 IEEE, pp. 276-282. DOI 10.1109/IMIS.2013.54.

(Continued)

*Primary Examiner* — Jayesh M Jhaveri
(74) *Attorney, Agent, or Firm* — Jay Wahlquist

(57) ABSTRACT

A system may be configured to provide secure access to a physical resource through the use of a partitionable virtual input/output server in a virtualized environment. A server may receive a request to access the physical resources from a cloud tenant administrator. The cloud tenant may be assigned to a particular working load partition (WPAR), and the physical resources may be assigned to the particular WPAR. A remote Kerberos server may be accessed in response to the request. The Kerberos server may be hosted in a private domain, and it may be used to authenticate access to the physical resource. The server may receive a valid ticket from the Kerberos server. The administrator may be granted access to the physical resources via access to the WPAR, based on the valid ticket and for the lifetime of the ticket.

18 Claims, 8 Drawing Sheets

(51) Int. Cl.
*G06F 9/50* (2006.01)
*G06F 9/455* (2018.01)

(52) U.S. Cl.
CPC ............ *G06F 9/5077* (2013.01); *H04L 9/321* (2013.01); *H04L 9/3213* (2013.01); *H04L 63/10* (2013.01)

(58) Field of Classification Search
CPC . G06F 21/33; G06F 21/53; G06F 9/48; G06F 9/32
See application file for complete search history.

(56) References Cited

U.S. PATENT DOCUMENTS

| | | |
|---|---|---|
| 7,783,788 B1 | 8/2010 | Quinn et al. |
| 8,914,511 B1 | 12/2014 | Yemini et al. |
| 8,966,464 B1 | 2/2015 | Christopher et al. |
| 9,075,539 B2 | 7/2015 | Cyr et al. |
| 2006/0224891 A1* | 10/2006 | Ilac ...................... H04L 9/0833 713/171 |
| 2007/0180493 A1* | 8/2007 | Croft ..................... G06F 3/1415 726/2 |
| 2009/0112969 A1* | 4/2009 | Ganesh ................. G06F 9/4856 709/202 |
| 2014/0032691 A1* | 1/2014 | Barton .................... H04L 41/00 709/206 |
| 2014/0108649 A1* | 4/2014 | Barton ................ G06F 9/45533 709/224 |
| 2015/0169329 A1* | 6/2015 | Barrat ....................... G06F 8/67 713/2 |
| 2015/0277791 A1 | 10/2015 | Li et al. |
| 2016/0034296 A1 | 2/2016 | Kedem et al. |
| 2016/0094546 A1* | 3/2016 | Innes .................. H04L 63/0823 713/156 |

OTHER PUBLICATIONS

Unknown, "What is a Kerberos Principal?", Kerberos V5 UNIX User's Guide, 1 page. Last printed Mar. 8, 2016. http://web.mit.edu/kerberos/krb5-1.5/krb5-1.5.4/doc/krb5-user/What-is-a-Kerberos-Principal_003f.html.

Mell et al., "The NIST Definition of Cloud Computing", Recommendations of the National Institute of Standards and Technology, NIST, U.S. Department of Commerce, Special Publication 800-145, Sep. 2011, 7 pages.

* cited by examiner

SECURE VIRTUALIZED SERVERS

BACKGROUND

The present disclosure relates to data access, and more specifically, to secure data access in a virtualized environment.

Cloud computing may refer to a type of Internet-based computing that provides shared processing resources and data to computers and other devices on demand. It can enable on-demand access to a shared pool of configurable computing resources, such as networks, servers, storage, applications, and services. In cloud computing, virtual machines may be provisioned based on virtual resources, rather than physical resources.

A virtualized I/O server (VIOS) is a virtualization technology by International Business Machines (IBM) which may allow for the sharing of physical resources between virtual I/O clients. The term VIOS may be equivalent to any other machine that shares resources with its clients on a different hardware or platform.

SUMMARY

Embodiments of the present disclosure may be directed toward a method for providing secure access to a physical resources via a partitionable virtual input/output server in a virtualized environment. The physical resources may be partitioned using Kerberos security. The method may begin when a request to access the physical resources has been received from a cloud tenant administrator. The tenant may be assigned to a particular working load partition (WPAR). The WPAR may be one of several WPARs hosted on a virtualized server in the virtualized environment. Physical resources may be assigned to each particular WPAR. In response to the request, a remote Kerberos server may be accessed. The Kerberos server may be hosted in a private domain and the Kerberos server may be able to authenticate access to the physical resources. The virtualized server may receive, from the Kerberos server, a valid ticket, and using the ticket, may grant access to the physical resources via the WPAR to the administrator.

Embodiments of the present disclosure may be directed toward a system for providing secure access to a physical resources via a partitionable virtual input/output server in a virtualized environment. The system may have a computer readable storage medium with program instructions and one or more processors. The processors may be configured to execute the program instructions to perform a method. The method may begin when a request to access the physical resources has been received from a cloud tenant administrator. The tenant may be assigned to a particular working load partition (WPAR). The WPAR may be one of several WPARs hosted on a virtualized server in the virtualized environment. Physical resources may be assigned to each particular WPAR. In response to the request, a remote Kerberos server may be accessed. The Kerberos server may be hosted in a private domain and the Kerberos server may be able to authenticate access to the physical resources. The virtualized server may receive, from the Kerberos server, a valid ticket, and using the ticket, may grant access to the physical resources via the WPAR to the administrator.

Embodiments of the present disclosure may be directed toward a computer program product for providing secure access to physical resources via a partitionable input/output server in a virtualized environment, wherein the physical resources are partitioned using Kerberos security. The computer program product may have a computer readable storage medium with program instructions embodied therewith and the computer readable storage medium is not a transitory signal per se. The program instructions may be executable by a computer processing circuit to cause the circuit to perform a method that begins when a request to access the physical resources has been received from a cloud tenant administrator. The tenant may be assigned to a particular working load partition (WPAR). The WPAR may be one of several WPARs hosted on a virtualized server in the virtualized environment. Physical resources may be assigned to each particular WPAR. In response to the request, a remote Kerberos server may be accessed. The Kerberos server may be hosted in a private domain and the Kerberos server may be able to authenticate access to the physical resources. The virtualized server may receive, from the Kerberos server, a valid ticket, and using the ticket, may grant access to the physical resources via the WPAR to the administrator.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
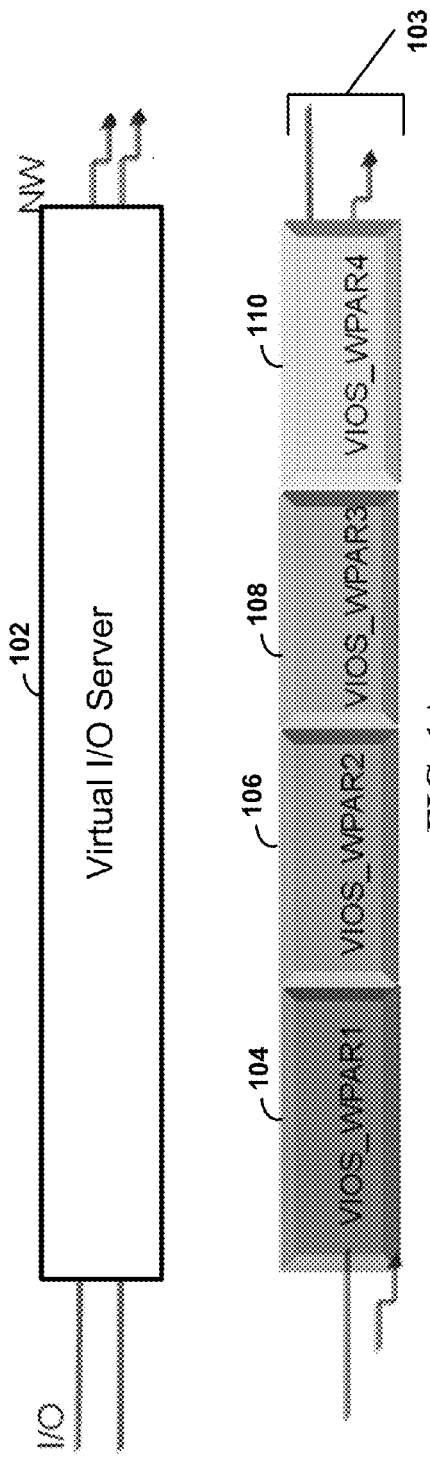
FIG. 1A depicts a block diagram of a comparison of a standard VIOS and a partitioned VIOS, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to cloud computing, more particular aspects relate to secure virtualized data access. While the present disclosure is not necessarily limited to such applications, various aspects of the disclosure may be appreciated through a discussion of various examples using this context.

In cloud computing, a virtual I/O server (VIOS) may facilitate the sharing of physical I/O resources among clients within the server. In the cloud environment, the cost of having single tenant VIO servers may be high because physical resources may be virtualized directly through the VIOS, and thus cannot be shared with multiple tenants.

In a virtualized environment, it is therefore often preferable to share the VIOS amongst multiple tenants. The tenants may be logically partitioned using workload partitioning (WPAR) logic. WPARs may allow for virtualization of an operating system without requiring the creation of full logical partitions (LPARs). As each LPAR may require its own operating system image and a certain number of physical resources, the ability to create and utilize WPARs in a virtualized environment may allow for a more fluid and effective means of allocating and distributing resources among tenants, without requiring the use of a full system image. Today, WPARs may be used frequently for application and workload isolation.

In embodiments, the disclosed may provide secure access of physical resources to multiple tenants or customers in a shared virtualized environment through the use of a VIOS with multiple WPARs, to which physical resources have been securely allocated using Kerberos security.

A setup as described herein may enable the cloud environment to support multiple VIOS demands of different tenants under the same physical VIOS. In embodiments, each tenant (e.g., each cloud tenant) may be assigned one or more accounts (e.g., cloud tenant accounts), through which administrators or other users may be granted access to the cloud tenant's data and resources. Additionally, this setup can allow each cloud tenant exclusive administration access, in order to allow each tenant to manage its own clients.

In embodiments, a server may receive a request from a tenant administrator to access a physical resource, for example, an input/output (I/O) adapter, or other physical resource allocated to the tenant. In the setup described, the tenant may be assigned to a particular WPAR. The physical resource may also have been assigned to the WPAR. In response to the request, the system may access a remote Kerberos server. In embodiments, the remote (Kerberos) server may be configured to communicate with the system server, over a wireless network connection, or in another manner suitable to the server. The Kerberos server may be hosted in a private domain, for example, by the tenant or the cloud provider for each tenant or by a third-party. The Kerberos server may be able to authenticate the administrator's access request to the particular WPAR. In this way, the resource authentication shifts from the VIOS to the tenant's server (e.g., each tenant may provide local authentication). The Kerberos server may authenticate the user's request and, in response, issue a valid ticket to the system. The valid ticket can then be used to grant the tenant administrator access of the WPAR and physical resources allocated therein. The administrator may be granted access only for a particular period of time, as designated by the lifetime of the Kerberos ticket. For example, a Kerberos ticket may expire after a particular period of time (e.g., the lifetime of the ticket), and the requesting administrator may be granted access to the particular WPAR and associated resources only for the duration of the lifetime of the ticket. Other physical resources assigned to a particular VIOS partition may include physical I/O adapters, network (N/W) adapters, or other devices attached to the physical adapters such as disk, tape, universal serial bus (USB) mass storage, or optical devices. As used herein, the tenant administrator may be any user that has been granted access to the particular WPAR on the VIOS.

FIG. 1A depicts a block diagram of a comparison of a standard VIOS 102 and a partitioned VIOS 103, according to embodiments of the present disclosure. A VIOS 102 may be software located in a logical partition that facilitates the sharing of physical I/O resources between client logical partitions within a server, and may be run on a processor-based server. As discussed herein, the VIOS 102 may be shared between multiple tenants, with the same VIOS hostname given to different users of the tenants. The different users may login with different identification data to the same sever. Since the VIOS 102 is shared amongst the tenants, the users may easily see and access the resources of other users of the VIOS 102. The shared VIOS 102 may also not provide for privacy for users when accessing the system and assigning resources to the tenants' clients.

In embodiments, in order to address these issues, the VIOS 102 may be partitioned into WPARs, as depicted at VIOS 103. VIOS 103 has been partitioned into four distinct WPARS, including VIOS_WPAR1 104, VIOS_WPAR2 106, VIOS_WPAR3 108, and VIOS_WPAR4 110. Each of these WPARs 104-110 may be accessed using a unique hostname, and each may have physical resources allocated directly to each.

The I/O lines and network (NW) lines associated with the VIOS 102 may represent the physical resources (e.g., I/O and NW adapters) allocated as a whole to the VIOS 102. In VIOS 103, the same physical resources exist, as represented by the I/O and NW lines, but instead of being available to the entire VIOS, have been associated specifically with a particular WPAR, for example VIOS_WPAR1 104 is shown to have a single I/O adapter and NW adapter allocated to it.

Figure 1B:
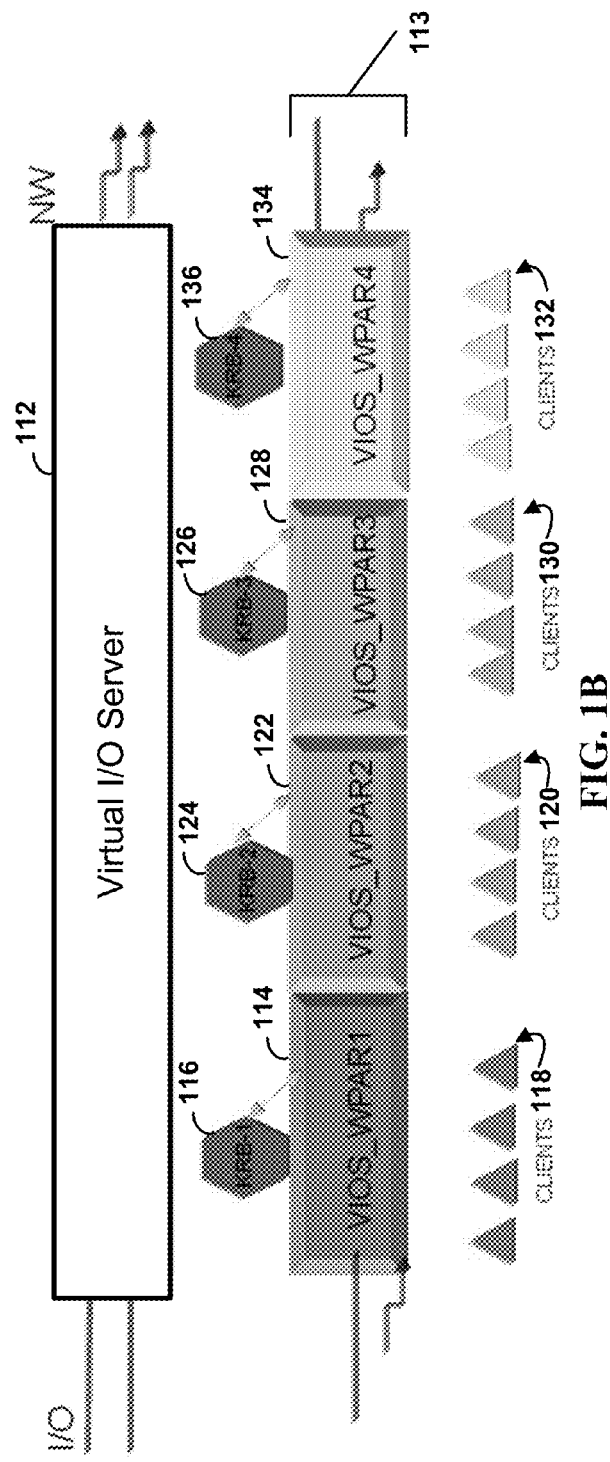
FIG. 1B depicts a block diagram of a comparison of a standard VIOS with a partitioned and secured VIOS, according to embodiments of the present disclosure.

FIG. 1B depicts a block diagram of a comparison of a standard VIOS 112 with a partitioned and secured VIOS 113, according to embodiments of the present disclosure. Similar to the VIOS 102 of FIG. 1A, VIOS 112 represents a standard VIOS, for which I/O adapters and NW adapters are shared and allocated amongst all tenants. VIOS 113 depicts a further modification to VIOS 103 of FIG. 1A. Like VIOS 103 of FIG. 1A, VIOS 113 has been partitioned into four WPARS. These WPARS include VIOS_WPAR1 114, VIOS_WPAR2 122, VIOS_WPAR3 128, and VIOS_WPAR4 134. As indicated by the I/O lines and NW arrows, the physical resources may be assigned to a particular WPAR (for example, VIOS_WPAR1 114).

In addition to WPAR partitioning, each WPAR in the VIOS 113 may be assigned a separate, remote Kerberos server, depicted as Kerberos servers 116, 124, 126, and 136. In embodiments, and as described herein, each tenant may control access to its WPAR through controlling access authentication via a remote Kerberos server. For example, access to VIOS-WPAR1 114 may be granted through ticketing from a Kerberos server 116, as described herein. The Kerberos server may be hosted by the tenant itself, in order to shift authentication and access for the virtualized resources from a cloud administrator back to the tenant. Ticketing from the Kerberos server 116 may provide authentication to VIOS_WPAR1 114, and thus to the physical resources associated with VIOS_WPAR1 114. In addition, clients 118, associated with VIOS_WPAR1 114 may be partitioned from the clients 120, 130, and 132, associated with other WPARs of the VIOS, VIOS_WPAR2 122, VIOS_WPAR3 128, and VIOS_WPAR4 134, respectively.

Figure 2:
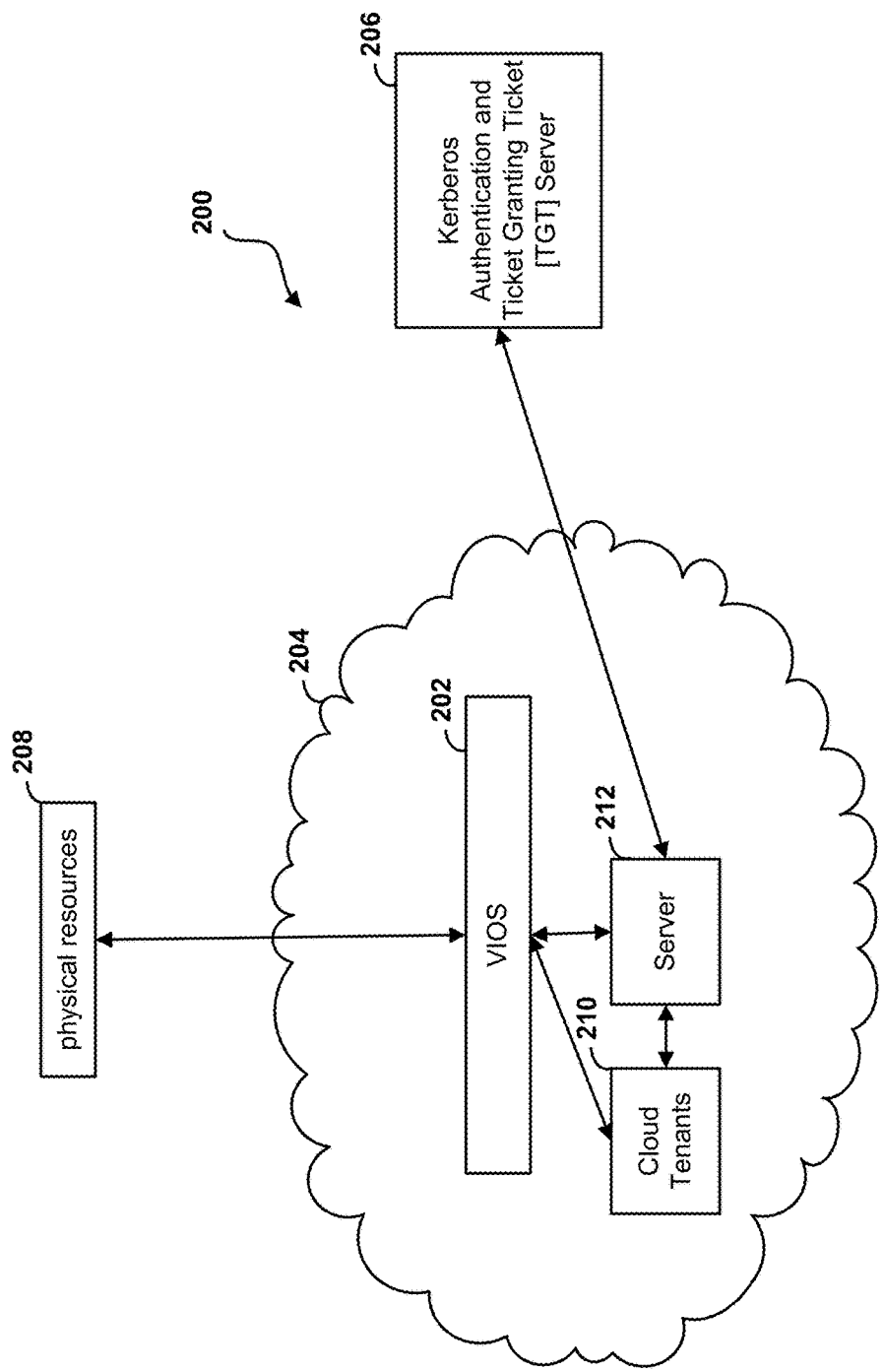
FIG. 2 depicts a system diagram of a system for enabling a virtual server to provide secure access to physical resources in a cloud environment, according to embodiments of the present disclosure.

FIG. 2 depicts a system diagram of a system 200 for enabling a virtual server 212 to provide secure access to physical resources 208 in a cloud environment 204, according to embodiments of the present disclosure. In embodiments, the VIOS 202 may be the partitioned VIOS 103 of FIG. 1A or 113 of FIG. 1B. In response to an incoming request from a cloud tenant 210, a server 212 may access a Kerberos Authentication and Ticket Granting Ticket (TGT) server 206. The TGT server 206 may be hosted locally by the requesting tenant. The TGT server 206 may be hosted at another remote site, on or off the cloud, as appropriate for the tenant or cloud environment. In response, the server 212 may receive, from the TGT server 206, a valid ticket, the valid ticket providing authentication to the particular WPAR of the VIOS 202. The ticket may allow the requesting cloud tenant 210 access to the physical resources 208 allocated to the WPAR on the VIOS 202. While FIG. 2 is described in a cloud computing environment, the system 200 may be carried out in any virtualized environment appropriate.

Figure 3:
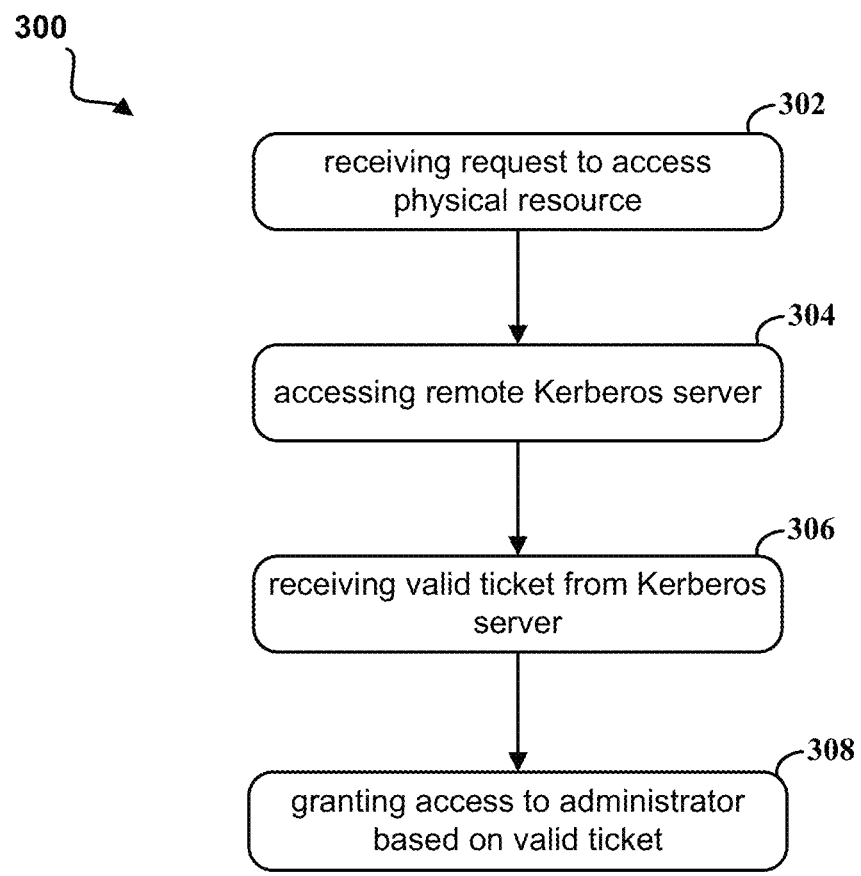
FIG. 3 depicts a flow diagram of a method for providing secure access to a physical resource via a virtual server, according to embodiments of the present disclosure.

FIG. 3 depicts a flow diagram of a method 300 for providing secure access to a physical resource via a virtual server, according to embodiments of the present disclosure. The method 300 may begin when a server, for example, a virtualized server hosted in a cloud environment, receives a request to access a physical resources, per 302. The request may come from an administrator or other user associated with a tenant of the cloud. In embodiments, a tenant may be a customer, company, or other entity to which a portion of a VIOS has been allocated for use. In response to the request, the server may access a remote Kerberos server, per 304. In embodiments, the Kerberos server may be hosted locally by the tenant, or by a cloud provider to the tenant. In this way, the authentication portion of accessing resources within a virtualized environment, may be shifted to the tenant.

In embodiments, the Kerberos server may have designated principals for specific resources prior to the authentication. For example, disk resources allocated to a particular WPAR may be accessed only by a particular user or set of users names, and thus the following could be created: <disk#>/<@WPAR_DOMAIN. In embodiments, a particular user name or set of user names may gain access to Ethernet resources allocated to the particular WPAR, based on a Kerberos server creating the following: <ent#/user name@WPAR_DOMAIN.

In response to the administrator (i.e., user) being authenticated by the Kerberos server, the virtualized server may receive a valid ticket from the Kerberos server, per 306. In embodiments, the valid ticket from the Kerberos server may have a predetermined lifetime, in order to allow the administrator access for only a particular period of time. Based on the valid ticket, the VIOS may grant access to physical resources allocated to the WPAR associated with the cloud tenant, per 308. In embodiments, this access may occur via the WPAR, in that the valid ticket may allow a user access to the WPAR, including partitioned data and clients. Physical resources allocated to the particular WPAR may be included in this access.

Figure 4:
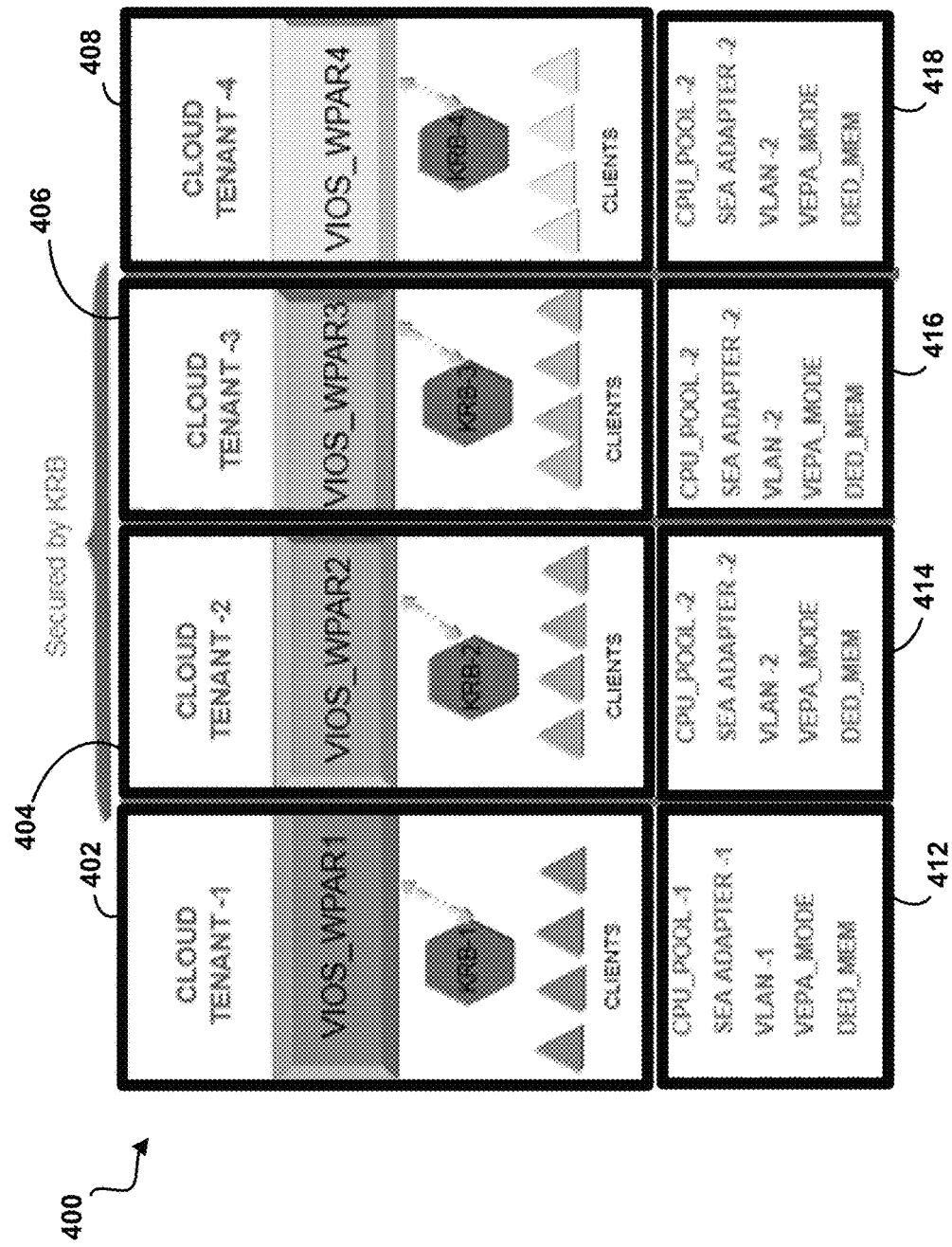
FIG. 4 depicts a block diagram of a partitioned virtual environment secured with Kerberos security, according to embodiments of the present disclosure.

FIG. 4 depicts a block diagram of a partitioned virtual environment secured with Kerberos security, according to embodiments of the present disclosure. In embodiments, like parts in FIG. 4 may correspond to like parts in FIGS. 1A and 1B. FIG. 4 depicts the portioning of access and allocation of resources using four WPARs and secured by Kerberos security.

Cloud tenant 1 and its allocated resources are shown at 402. As depicted, cloud tenant 1 may be assigned to a WPAR of the VIOS, here VIOS_WPAR1. Cloud tenant 1 may also then be provided exclusive access and control over its set of clients. This partitioning may be secured through the use of Kerberos security, via a remote Kerberos server (KRB-1), which may authenticate an administrator associated with cloud tenant 1. Physical resources may also be allocated to cloud tenant 1. These resources are depicted within a box at 412, to show the logical partitioning between, for example, the resources allocated to cloud tenant 1, and those allocated to cloud tenant 2 (414), cloud tenant 3 (416), and cloud tenant 4 (418). Examples of physical resources depicted herein may include: a plurality or "pool" of central processing units (CPU_POOL), a shared Ethernet adapter (SEA adapter), a virtual local area network (VLAN), a virtual Ethernet port aggregator (VEPA_MODE), and dedicated memory (DED_MEM). Cloud tenant 2, cloud tenant 3, and cloud tenant 4 (404, 406, and 408, respectively), may be partitioned, with resources allocated, as described at cloud tenant 1 (402 and 412).

Figure 5:
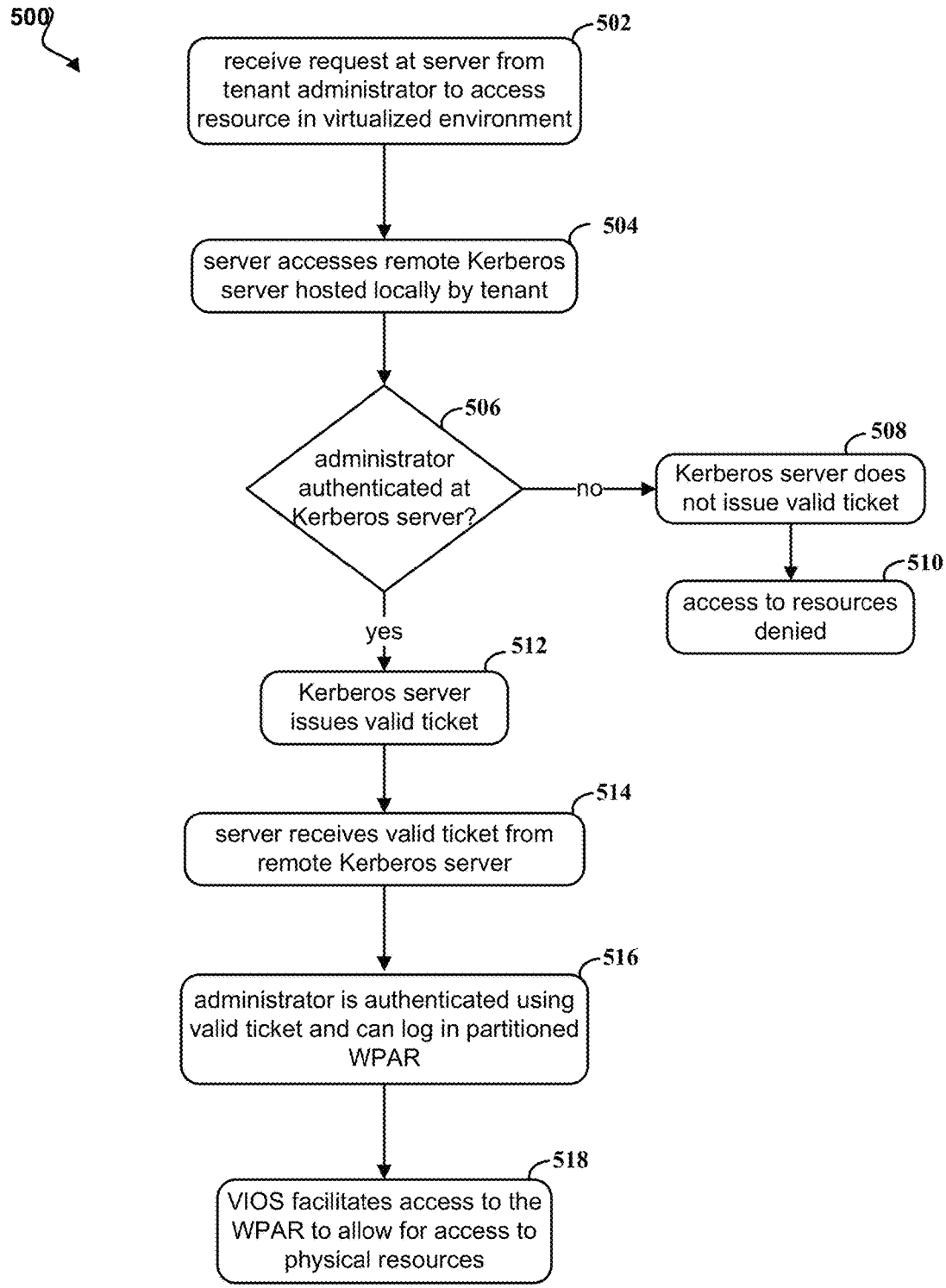
FIG. 5 depicts a flow diagram of a method for providing secure access to physical resources using Kerberos security in a virtualized environment, according to embodiments of the present disclosure.

FIG. 5 depicts a flow diagram of a method 500 for providing secure access to physical resources using Kerberos security in a virtualized environment, according to embodiments of the present disclosure. The method 500 may begin when a server, for example, a virtualized server running on the cloud, receives a request from a tenant administrator to access a resource in the virtualized environment, per 502. In embodiments, the request may come from any authorized user associated with the tenant. As discussed herein, a tenant may be a customer, company, or other entity to whom a WPAR has been allocated. In response to the request, the server may access a remote Kerberos server, per 504. The Kerberos server may be hosted locally by the cloud tenant, or in another location (e.g., in a location other than the particular virtualized environment in which the server and VIOS are running). At 506, the Kerberos server may, using known methods, authenticate the administrator, signifying that the user is a valid user associated with the cloud tenant. If the administrator is authenticated at the Kerberos server, the Kerberos server may issue a valid ticket, per 512. This ticket may be received at the virtualized server, per 514, and the administrator is authenticated and granted access to the partitioned WPAR, per 516. In embodiments, the user may be given access to the physical resources allocated to the WPAR, per 518. As the physical resources may be allocated specifically to a particular WPAR, (as illustrated in, for example, FIG. 4), the user access to the physical resources may occur automatically (i.e., without further action required) upon the grant of access to the WPAR.

If, at 506, the Kerberos server does not authenticate the administrator (e.g., does not recognize the user as an authorized user), per 508, the Kerberos server may not issue a valid ticket, and access to the particular WPAR (and its associated resources and assigned clients), may be denied, per 510.

Figure 6:
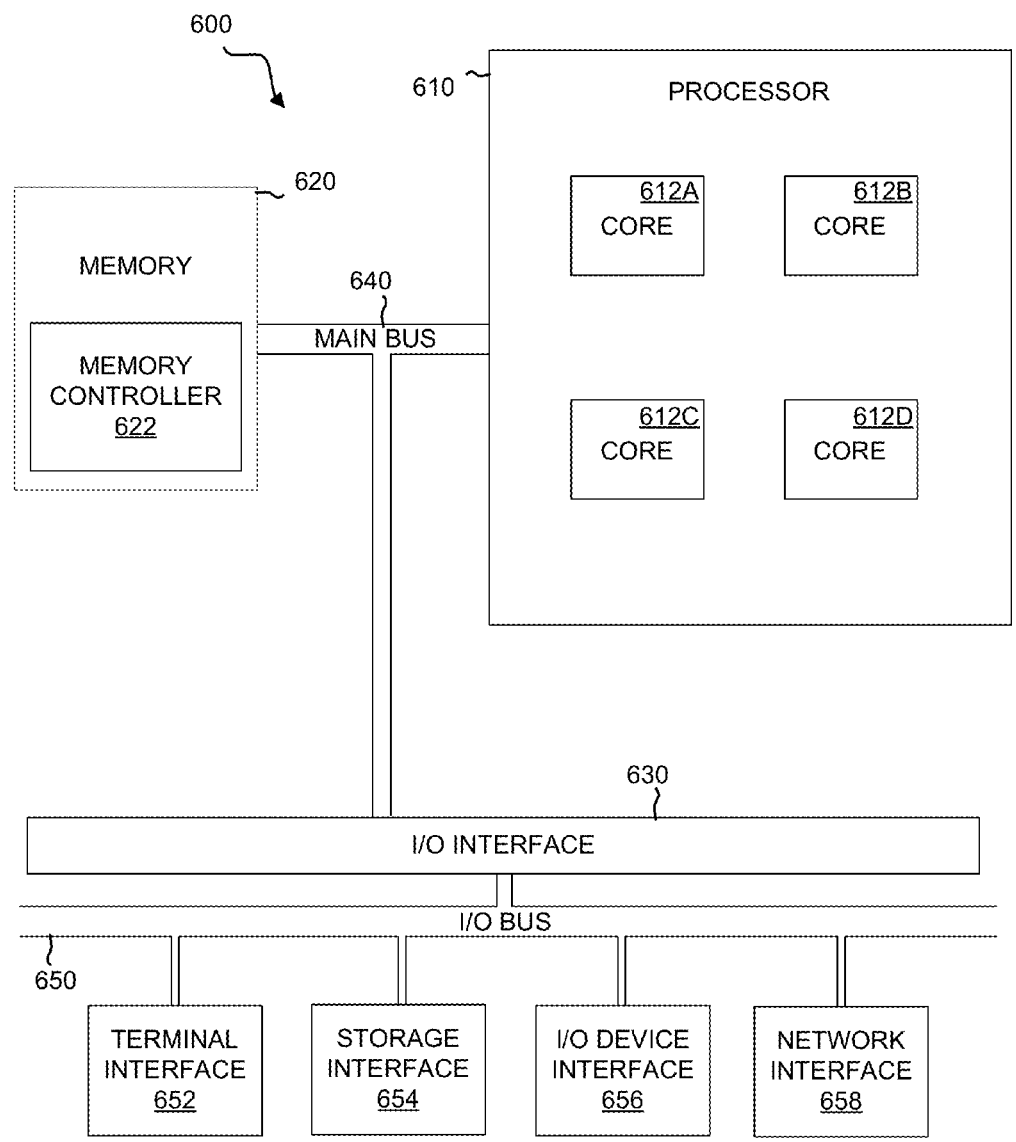
FIG. 6 depicts the representative major components of an example computer system that may be used, according to embodiments of the present disclosure.

FIG. 6 depicts the representative major components of an example computer system 600 that may be used, in accordance with embodiments of the present disclosure. It is appreciated that individual components may vary in complexity, number, type, and\or configuration. The particular examples disclosed are for example purposes only and are not necessarily the only such variations. The computer system 600 may comprise a processor 610, memory 620, an input/output interface (herein I/O or I/O interface) 630, and a main bus 640. The main bus 640 may provide communication pathways for the other components of the computer system 600. In some embodiments, the main bus 640 may connect to other components such as a specialized digital signal processor (not depicted).

The processor 610 of the computer system 600 may be comprised of one or more cores 612A, 612B, 612C, 612D (collectively 612). The processor 610 may additionally include one or more memory buffers or caches (not depicted) that provide temporary storage of instructions and data for the cores 612. The cores 612 may perform instructions on input provided from the caches or from the memory 620 and output the result to caches or the memory. The cores 612 may be comprised of one or more circuits configured to perform one or methods consistent with embodiments of the present disclosure. In some embodiments, the computer system 600 may contain multiple processors 610. In some embodiments, the computer system 600 may be a single processor 610 with a singular core 612.

The memory 620 of the computer system 601 may include a memory controller 622. In some embodiments, the memory 620 may comprise a random-access semiconductor memory, storage device, or storage medium (either volatile or non-volatile) for storing data and programs. In some embodiments, the memory may be in the form of modules (e.g., dual in-line memory modules). The memory controller 622 may communicate with the processor 610, facilitating storage and retrieval of information in the memory 620. The memory controller 622 may communicate with the I/O interface 630, facilitating storage and retrieval of input or output in the memory 620.

The I/O interface 630 may comprise an I/O bus 650, a terminal interface 652, a storage interface 654, an I/O device interface 656, and a network interface 658. The I/O interface 630 may connect the main bus 640 to the I/O bus 650. The I/O interface 630 may direct instructions and data from the processor 610 and memory 620 to the various interfaces of the I/O bus 650. The I/O interface 630 may also direct instructions and data from the various interfaces of the I/O bus 650 to the processor 610 and memory 620. The various interfaces may include the terminal interface 652, the storage interface 654, the I/O device interface 656, and the network interface 658. In some embodiments, the various interfaces may include a subset of the aforementioned interfaces (e.g., an embedded computer system in an industrial application may not include the terminal interface 652 and the storage interface 654).

Logic modules throughout the computer system 600— including but not limited to the memory 620, the processor 610, and the I/O interface 630—may communicate failures and changes to one or more components to a hypervisor or operating system (not depicted). The hypervisor or the operating system may allocate the various resources available in the computer system 600 and track the location of data in memory 620 and of processes assigned to various cores 612. In embodiments that combine or rearrange elements, aspects and capabilities of the logic modules may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
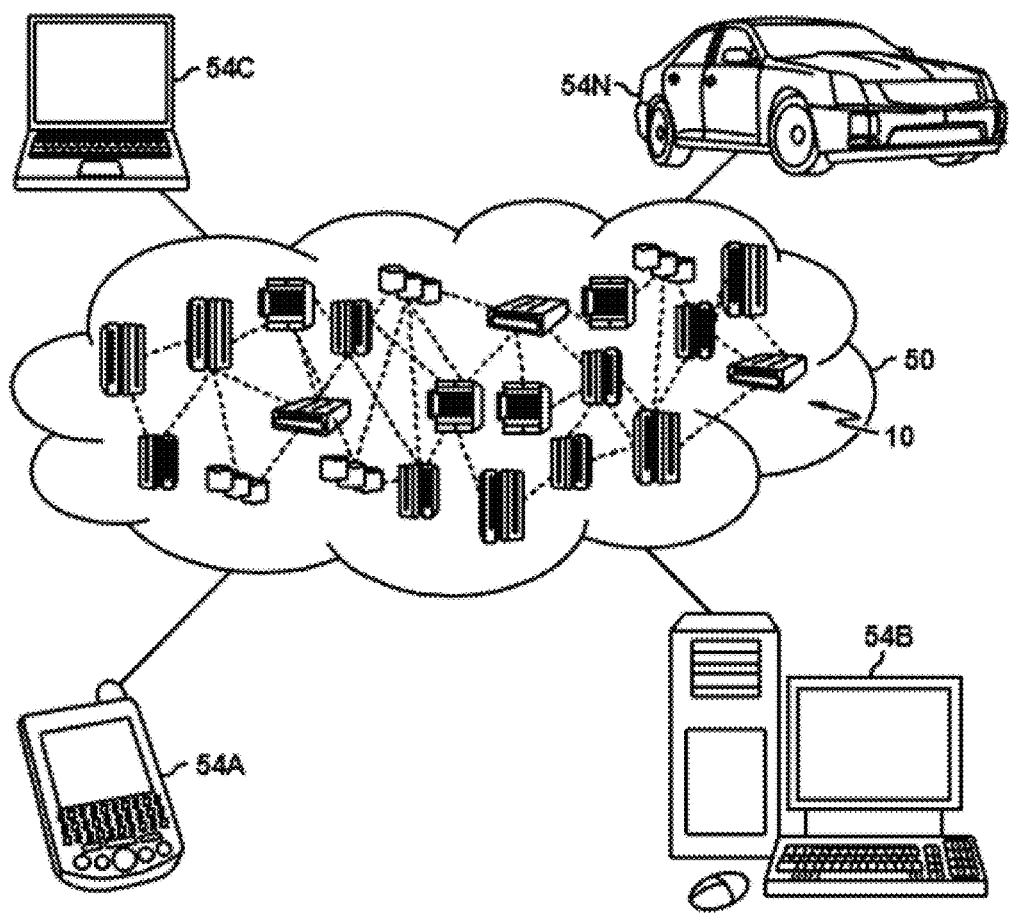
FIG. 7 depicts a cloud computing environment according to embodiments of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
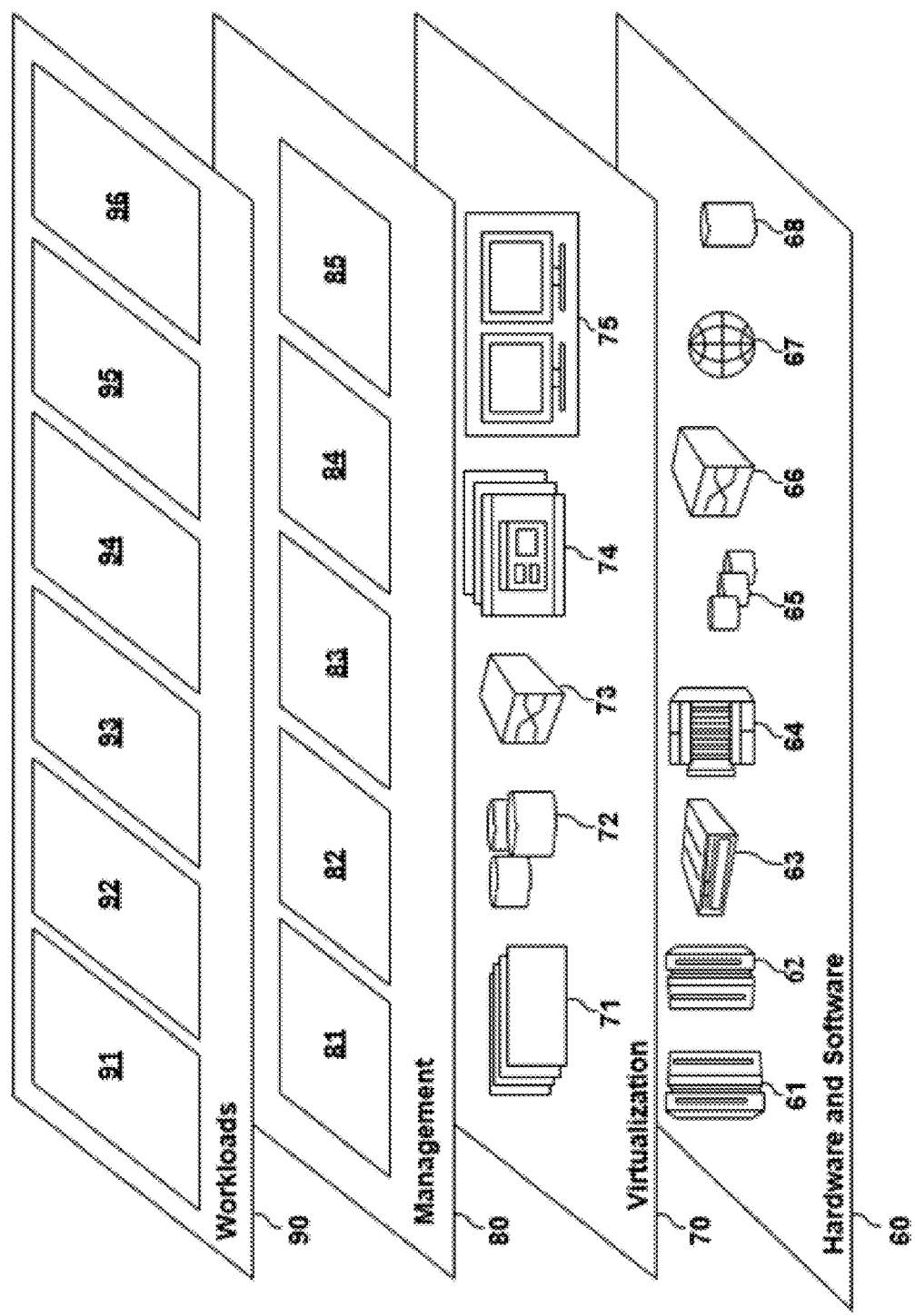
FIG. 8 depicts abstraction model layers according to embodiments of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure virtualized server partitioning 96.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for providing secure access to physical resources via a partitionable virtual input/output server in a virtualized environment, wherein the physical resources are partitioned using Kerberos security, the method comprising:
   receiving, from an administrator, a request to access the physical resources, wherein the administrator is a user of a cloud tenant, and wherein the tenant is assigned to a particular working load partition (WPAR) of a plurality of WPARs hosted on a virtualized server in the virtualized environment, and wherein the physical resources are assigned to the particular WPAR;
   accessing, in response to the request, a remote Kerberos server, the remote Kerberos server is hosted in a private domain, and the remote Kerberos server is able to authenticate access to the physical resource;
   receiving, from the Kerberos server, a valid ticket;
   granting, to the administrator, based on the valid ticket, and for a lifetime of the ticket, access to the physical resources via access to the WPAR, wherein the granting access to the physical resources further comprises granting access to clients assigned to the physical resources.

2. The method of claim 1, wherein the particular WPAR is assigned a set of clients and a set of physical resources, wherein the physical resources are included in the set of physical resources assigned to the particular WPAR.

3. The method of claim 1, wherein the remote Kerberos server is hosted locally by the cloud tenant.

4. The method of claim 1, wherein the administrator is a verified user of a cloud tenant account, wherein the cloud tenant account has been assigned to the cloud tenant.

5. The method of claim 1, wherein the remote Kerberos server is hosted by a third-party.

6. The method of claim 2, wherein the set of physical resources comprise server hardware.

7. A system for providing secure access to physical resources via a partitionable virtual input/output server in a virtualized environment, wherein the physical resources are partitioned using Kerberos security, the system comprising:
- a computer readable storage medium with program instructions stored thereon; and
- one or more processors configured to execute the program instructions to perform a method comprising:
- receiving, from an administrator, a request to access the physical resources, wherein the administrator is a user of a cloud tenant, and wherein the tenant is assigned to a particular working load partition (WPAR) of a plurality of WPARs hosted on a virtualized server in the virtualized environment, and wherein the physical resource are assigned to the particular WPAR;
- accessing, in response to the request, a remote Kerberos server, the remote Kerberos server is hosted in a private domain, and the remote Kerberos server is able to authenticate access to the physical resource;
- receiving, from the Kerberos server, a valid ticket,
- granting, to the administrator, based on the valid ticket, and for a lifetime of the ticket, access to the physical resources via access to the WPAR, wherein the granting access to the physical resources further comprises granting access to clients assigned to the physical resources.

8. The system of claim 7, wherein the particular WPAR is assigned a set of clients and a set of physical resources, wherein the physical resources are included in the set of physical resources assigned to the particular WPAR.

9. The system of claim 7, wherein the remote Kerberos server is hosted locally by the cloud tenant.

10. The system of claim 7, wherein the administrator is a verified user of a cloud tenant account, wherein the cloud tenant account has been assigned to the cloud tenant.

11. The system of claim 7, wherein the remote Kerberos server is hosted by a third-party.

12. The system of claim 8, wherein the set of physical resources comprise server hardware.

13. A computer program product for providing secure access to physical resources via a partitionable input/output server in a virtualized environment, wherein the physical resources are partitioned using Kerberos security, the computer program product comprising a computer readable storage medium having program instructions embodied therewith, wherein the computer readable storage medium is not a transitory signal per se, the program instructions executable by a computer processing circuit to cause the circuit to perform the method comprising:
- receiving, from an administrator, a request to access the physical resources, wherein the administrator is a user of a cloud tenant, and wherein the tenant is assigned to a particular working load partition (WPAR) of a plurality of WPARs hosted on a virtualized server in the virtualized environment, and wherein the physical resources are assigned to the particular WPAR;
- accessing, in response to the request, a remote Kerberos server, the remote Kerberos server is hosted in a private domain, and the remote Kerberos server is able to authenticate access to the physical resource;
- receiving, from the Kerberos server, a valid ticket,
- granting, to the administrator, based on the valid ticket, and for a lifetime of the ticket, access to the physical resources via access to the WPAR, wherein the granting access to the physical resources further comprises granting access to clients assigned to the physical resources.

14. The computer program product of claim 13, wherein the particular WPAR is assigned a set of clients and a set of physical resources, wherein the physical resources are included in the set of physical resources assigned to the particular WPAR.

15. The computer program product of claim 13, wherein the remote Kerberos server is hosted locally by the cloud tenant.

16. The computer program product of claim 13, wherein the administrator is a verified user of a cloud tenant account, wherein the cloud tenant account has been assigned to the cloud tenant.

17. The computer program product of claim 13, wherein the remote Kerberos server is hosted by a third-party.

18. The computer program product of claim 14, wherein the set of physical resources comprise server hardware.

* * * * *